No. 880,823. PATENTED MAR. 3, 1908.
C. L. REDFIELD.
MOTOR VEHICLE.
APPLICATION FILED APR. 17, 1900. RENEWED NOV. 14, 1904.

4 SHEETS—SHEET 1.

WITNESSES:
Howard A. Redfield
H. C. Fischer

INVENTOR:
Casper L. Redfield

No. 880,823. PATENTED MAR. 3, 1908.
C. L. REDFIELD.
MOTOR VEHICLE.
APPLICATION FILED APR. 17, 1900. RENEWED NOV. 14, 1904.
4 SHEETS—SHEET 2.
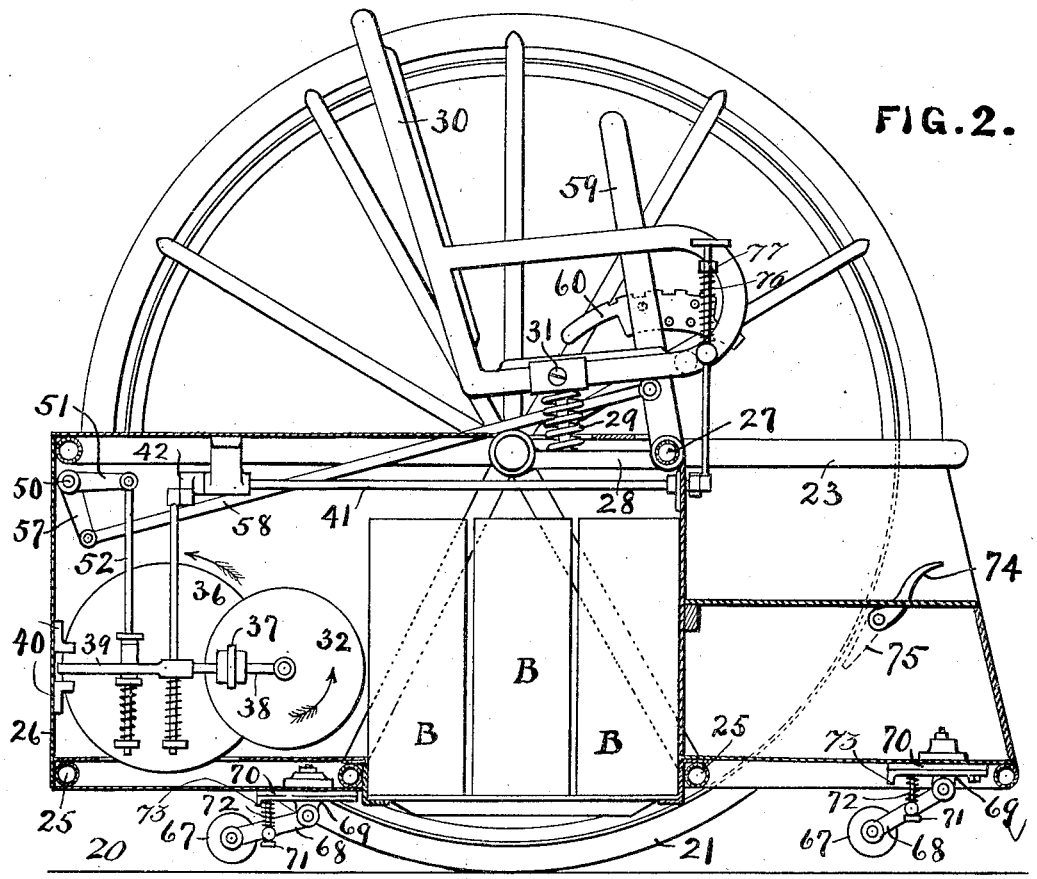
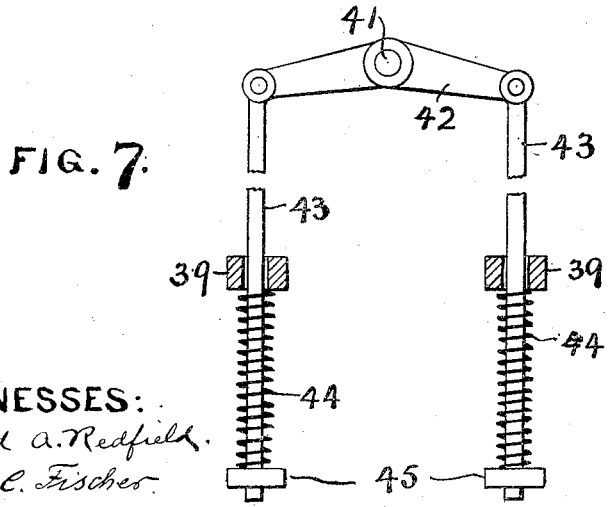
WITNESSES:
Howard A. Redfield.
H. C. Fischer.
INVENTOR:
Casper L. Redfield No. 880,823. PATENTED MAR. 3, 1908.
C. L. REDFIELD.
MOTOR VEHICLE.
APPLICATION FILED APR. 17, 1900. RENEWED NOV. 14, 1904.
4 SHEETS—SHEET 3.
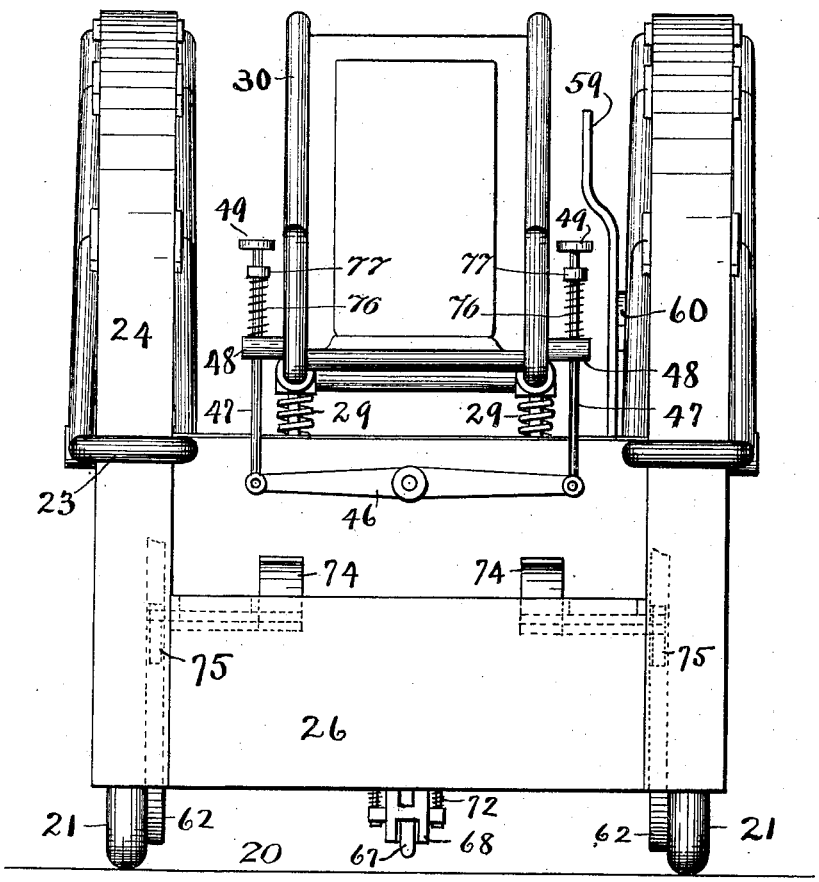
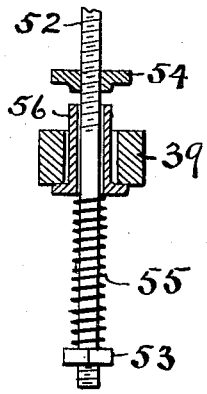
WITNESSES:
Howard A. Redfield.
H. C. Fischer
INVENTOR:
Casper L. Redfield

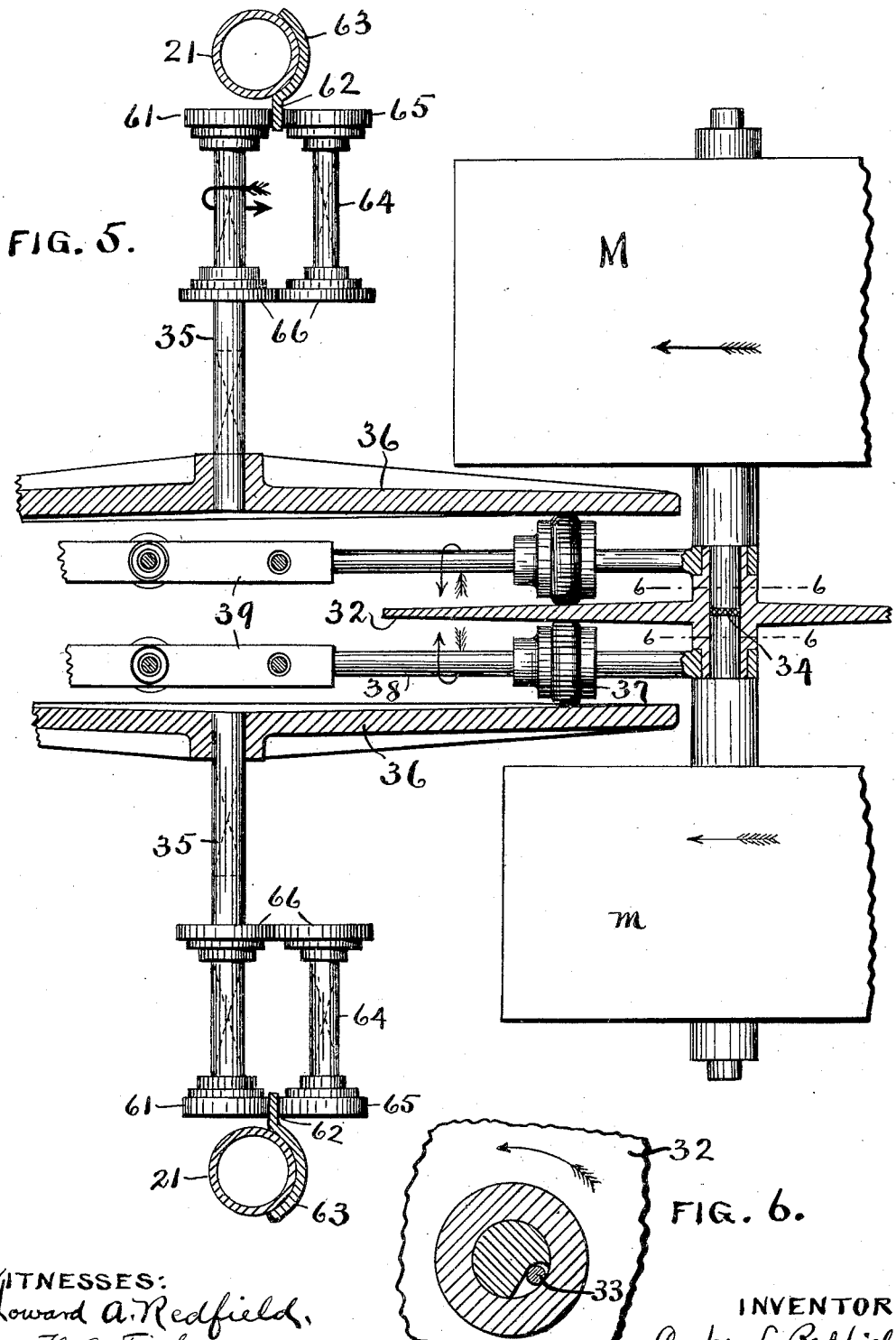

UNITED STATES PATENT OFFICE.

CASPER L. REDFIELD, OF CHICAGO, ILLINOIS.

MOTOR-VEHICLE.

No. 880,823.  Specification of Letters Patent.  Patented March 3, 1908.

Application filed April 17, 1900. Serial No. 13,200. Renewed November 14, 1904. Serial No. 232,620.

*To all whom it may concern:*

Be it known that I, CASPER L. REDFIELD, a citizen of the United States of America, and resident of Chicago, county of Cook, State of Illinois, have invented certain new and useful Improvements in Motor-Vehicles, of which the following is a specification.

My invention relates to motor vehicles and their driving mechanism, and has for its object convenience and economy of both material and power.

In explaining my invention I have chosen to illustrate it as applied to a form of vehicle which I call a duocycle. For the purposes of this specification I will define a duocycle as a two-wheeled vehicle having both wheels on the same axis, though not necessarily on the same axle. It is also a vehicle which maintains its proper balance by the distribution of weight and not by a third support to the ground. The weight used to maintain this balance is that which is also used to propel the vehicle, hence the duocycle is the simplest and lightest form of self-contained, power driven vehicle.

In any power driven vehicle it is necessary to furnish power enough to carry the vehicle over rough roads and up moderate grades. To avoid the necessity of using excessively heavy motors it is common to use change gearing so that the vehicle may have two or three different speeds for one speed of the motor. I have adopted this form except that instead of having fixed ratios of change as is commonly used, I choose a maximum and minimum of variation and then provide means for using all possible variations between the extremes. I also provide a governing device which weighs the resistance to driving the vehicle, and the weight so obtained automatically changes the speed so that the power consumed is that which is the most economical or most desirable for the motor employed.

In addition to the elements referred to in the foregoing general statement, there are certain other devices which will be more readily understood from the detailed description.

Figure 1:
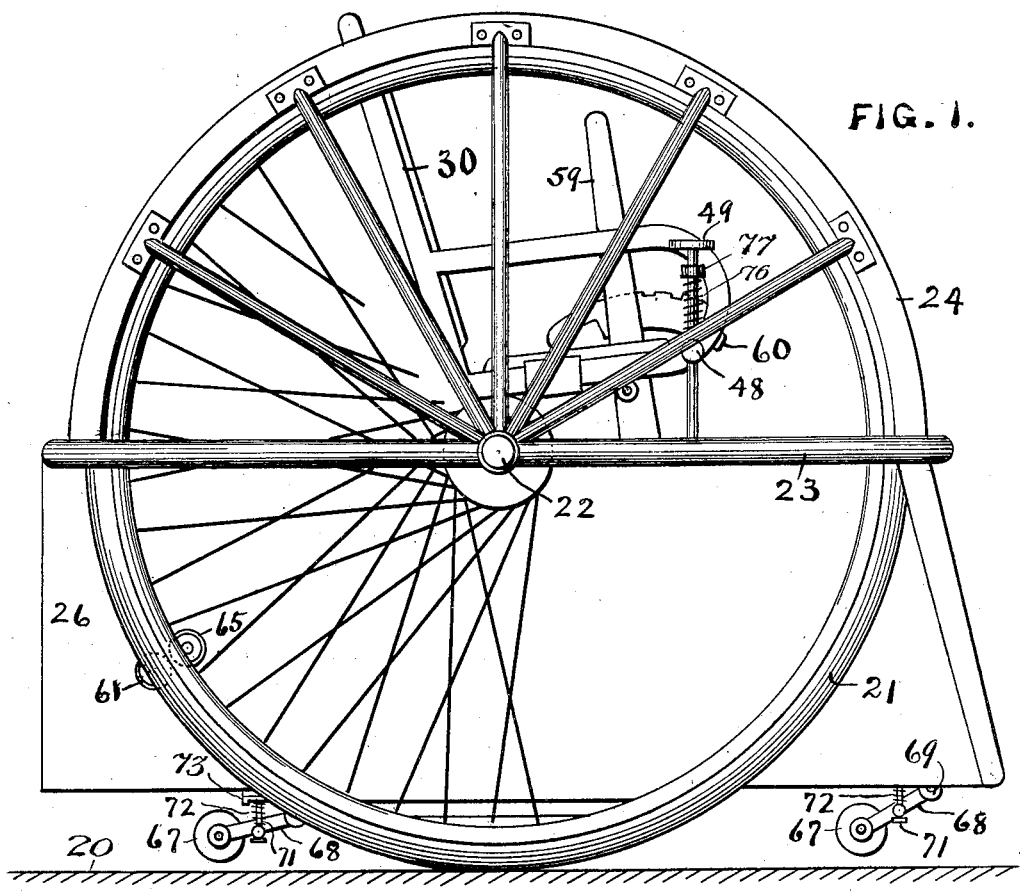
Figure 4:
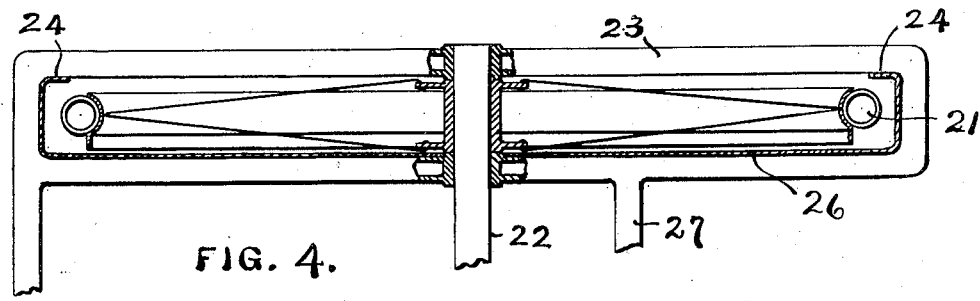

In the accompanying drawings, Figure 1 is a side elevation; Fig. 2 is a longitudinal section; Fig. 3 is a front elevation; Fig. 4 is a horizontal section of one of the wheels showing the adjacent frame work; Fig. 5 is a diagram of the driving mechanism partly in section; Fig. 6 is a section on either of the lines 6—6 of Fig. 5; and Figs. 7 and 8 are details to be hereinafter described.

In the said drawings 20 represents the ground on which the vehicle runs. The wheels 21 are of the ordinary bicycle construction, the spokes of which are omitted in Fig. 2 and only partly shown in Fig. 1 for the purpose of avoiding a confusion of lines. The wheels 21 are loosely mounted upon a common tubular axle 22, the ends of which are secured in the hubs of the inclosing frames 23. A sheet metal guard 24 extends over the upper half of each wheel and is connected to the frame 23 at the front and rear. The guards 24 are supported at several points by tubular spokes which radiate from the hubs of the frames 23. Suspended from the frames 23 is a frame work composed of tubes 25 to which is secured a shell 26. This shell contains the power devices. On the axle 22 and a cross tube 27 are two bridges 28 upon which are mounted the springs 29. Carried on the springs 29 is a chair 30, which is so arranged that a person sitting therein may tilt it backward after the manner of an ordinary office chair, and in so doing may shift the center of his gravity with respect to the axle 22. By means of a screw 31 the chair 30 may be shifted either toward the front or rear with respect to the springs 29, so that the rider may locate his center of gravity to suit his own weight and his own ideas of the position he wishes to occupy.

Within the inclosed space below the chair 30 is a battery B composed of a series of storage cells. This battery is the heaviest part of the vehicle and is located at the lowest possible position so as to maintain the seat and rider in a desired balance. Just back of the battery B are two electric motors M and m, the shafts of which are in line and nearly in contact. A disk 32 has its hub mounted on the ends of both motor shafts. A groove is cut in the end of each shaft as shown in Fig. 6, and in each groove is placed a short piece of wire 33. When the motor shaft rotates in the direction of the arrow, the wire 33 will bind in the hub of the disk 32 and carry it forward at the same speed as the motor. With the motor shaft standing still the disk may rotate in the same direction without affecting the motor. It will therefore be apparent that with this construction, the disk 32 may be driven by either motor independently or by both together. A small washer 34 within the hub of the disk 32 and between the ends of the motor shafts, prevents the wire 33 in one shaft from conflicting with the groove in the other shaft.

To the rear of, and parallel with, the motor shafts are two shafts 35, which are in line and which carry disks 36. The disk 32 lies between and overlaps the disks 36, and between the disk 32 and the disks 36 are two friction rollers 37 which are loosely mounted upon and rotate about the rods 38 which are pivoted on the motor shafts. The rollers 37 have their friction surfaces of rubber or some other yielding material, and are free to slide axially on the rods 38. With the rods 38 supported in line between the axes of the motor shafts and shafts 35 and with the disk 32 driven, the rotating planes of the rollers 37 will lie tangent to their tracks on the disks 32 and 36, and there will be no tendency for the rollers to move in either direction on their supporting rods 38. If, however, one of the rods 38 be lowered, the rotating plane of the roller will continue to be tangent to its track on the disk 32 but will be set at an inclination to its track on the disk 36. If the direction of rotation be that of the arrows in Figs. 1 and 5, then this inclined position will cause the roller to travel outward on the disk 36 and be forced inward on the disk 32. If the rod 38 were raised above the center of disk 36, the roller would travel outward on disk 32 and inward on disk 36. It will be obvious that with the disk 32 rotating at a constant speed, a movement of the rollers toward the axis of the motors will cause the disks 36 to rotate more slowly while a movement in an opposite direction will cause them to rotate more rapidly. On the outer end of each rod 38 is an extension piece 39, the ends of which lie between limiting brackets 40 on the outside shell. On a shaft 41 supported in the upper part of the inclosing shell 26 is a double armed lever 42, to the ends of which are pivoted the rods 43 that pass down through openings in the extensions 39. Spring 44 and nuts 45 on the rods 43 serve to support the rods 38 and rollers 37 in a horizontal position. Any motor, whether it be an electric motor or a steam engine, has some point of power output at which it is most economical, or efficient, which point may be approximately determined by experiment. Assuming that this point for the small motor $m$ be known, and that the nuts 45 be adjusted so that the supporting tension of the springs 44 when the rods 38 are horizontal is just equal to the most efficient torque of this motor, then if the resistance on the shafts 35 be uniform and the motor $m$ be driving, the rods 38 and their rollers 37 will remain in a horizontal position and the speed of the shafts 35 will be uniform. If, however, additional resistance be thrown upon the shafts 35, this resistance will be communicated to the rollers 37 which will cause the rods 38 to be depressed by compressing the springs 44. In this depressed position the rollers travel outwards on the disks 36 and inward on the disks 32 until the driving force and leverage has increased enough to balance the additional resistance, when the rods will again rise to a horizontal position and the motion become uniform. If the resistance should decrease, the springs 44 would raise the rods 38 above the horizontal and the rollers 37 would travel to the left, increasing the driven speed until that speed corresponded to the resistance offered.

The mechanism just explained is in effect an automatic governor which weighs the resistance to driving and adjusts the ratio of speed between the driver and the driven so that the driven consumes a constant power under large variations of resistance. While this governor has been described as a controller for a variable speed mechanism, a little consideration will show that it is applicable to a variety of uses other than serving as part of a driving mechanism for a vehicle. For example, by adjusting the springs 44 to different tensions it may be used as a means for testing the behavior of the motor $m$ under different loads. On the front end of the shaft 41 is a second lever 46 to the ends of which are connected the rods 47 that extend upward at the sides of the chair 30 and are guided in the brackets 48 thereon. The rods 47 terminate in button heads 49 that are in easy reach of the occupant of the chair. By pressing of the buttons 49 the lever 42 may be oscillated so as to increase the tension on one spring 44 and decrease it on the other. The result of this will be to raise one rod 38 and depress the other, thus causing the rollers 37 to move in opposite directions so as to increase the speed of one disk 36 and decrease the speed of the other. As these disks are connected to the wheels of the vehicle, as will be hereinafter described, it will be evident that the wheels will be caused to run at different speeds and the vehicle to be caused to turn at the right or the left. These connections therefore serve as a means for adjusting the governor so that it will act as a steering device.

In the rear upper part of the inclosing shell 26 is a shaft 50 on which is an arm 51. Pivoted on the end of the arm 51 are two rods 52 which extend downward through the extensions 39 of the rods 38. On each rod 52 are two nuts 53 and 54, a spring 55 and a loose sleeve 56. The arm 51, and consequently the rods 52 and parts carried thereby, has three positions. The lowest position is shown in Fig. 2. In this position the sleeves 56 are loose in the extensions 39, and the rods 38 may move freely up and down within the limits permitted by the stop brackets 40 without affecting or being affected by the parts carried on the rods 52.

In the middle position the collars on the sleeves 56 engage the lower faces of the extensions 39, and when these extensions are in their mid position, the tensions on the springs 55 equals the difference between the torques of the large motor M and the small motor m. In other words, the combined tensions of the springs 44 and the springs 55 equals the torque of the large motor. This position is shown in Fig. 8 from which it will be seen that the spring 55 may raise the extension 39 or permit it to be depressed. The nut 53 serves for applying the proper extension to the spring 55, and the nut 54 serves to hold the sleeve 56 down so that its flange will not come in contact with the extension 39 when said sleeve is at its lowest position. In the third, or highest position, the rods 52 are raised enough so that the initial tension of the spring 55, when the extensions 39 are horizontal, equals the torque of the larger motor M. From this description it will be seen that when the lever 51 is in its lowest position the support from the rollers 37 consists of the springs 44, the tension of which equals the torque of the small motor; when in the mid-position the support consists of the springs 44 and 55 with a combined tension equal to the torque of the large motor; and when in the highest position the support is from the same springs but with a tension equal to the torque of both motors. An arm 57 and a rod 58 serve as a connection from shaft 51 to a hand lever 59 within easy reach of a person in the chair 30 so that he can move the rod 52 into any position. The lever 59 is held in any position by means of the quadrant 60, on which are some contact points. The two upper contact points represent electrical connections from the battery B to the small motor m and the two lower ones similar connections to the large motor M. These contact points are so arranged that as the lever 59 is moved to throw addition tension under the rollers 37 it also connects the corresponding driving power. The springs 44 being supported from a lever 42 which is free to oscillate about its center, are in a somewhat unstable equilibrium, so that if one wheel of the vehicle meets more resistance than the other it may be caused to run slower and change the course of the vehicle. This is of course controllable from the buttons 49 by the rider, but to make it more stable the arms of the lever 42 are inclined downward from their pivoting center, so that when it is oscillated there is a continued tendency for it to return to its mid-position.

Assuming that the motors are delivering a constant power at a constant speed, which is the condition of greatest economy or efficiency, the friction rollers 37 will transmit a greater force when near the motors than when farther from them. As the pressure between the rollers and the disks must be sufficient to transmit the force of the motors at whatever position they may happen to be, and as the force varies from the maximum near the center of the disk 32 to the minimum near its outer edge, it will be evident that this pressure may be varied also. This increase and decrease of pressure to correspond with the force to be transmitted is accomplished by making the disk 32 tapering and the disk 36 dished as shown somewhat exaggerated in Fig. 5. This tapering and dishing of the disks (the amount of which will depend upon the character of the material out of which the rollers 37 are made) is in the nature of an automatic means for increasing and decreasing the frictional contact in direct proportion to the force to be transmitted.

On the outer end of each shaft 35 is a friction roller 61 which engages a flange 62 on the rim 63 of the wheel 21 for the purpose of driving it. Supported in convenient bearings adjacent to each shaft 35 is another shaft 64 which has a roller 65 that engages the opposite side of the flange 62. Friction rollers 66 convey power from shafts 35 to shafts 64. The vehicle being a duocycle is intended to be balanced on two wheels by the distribution of weight suspended from the axis of the wheels. The action of the rollers 61 and 65 in driving the wheels tends to turn the body of the vehicle on its axis so as to raise the forward part and depress the rear part, and the distance (or angle) through which it is turned will depend upon the driving force transmitted through the rollers 61 and 65. As this force varies with the resistance to driving it will be evident that this turning of the body of the vehicle will be greater at some times than at others. Ordinarily the driver will adjust the position of his seat so that the vehicle will balance under the average conditions of the road, but as average conditions do not always exist it is desirable to provide some means for preventing the body of the vehicle from tipping too far forward or back. Such means is supplied in the auxiliary wheels or rollers 67 located near the ground at the front and rear of the center. These rollers are supported in arms 68 which are pivoted for vertical movement to the blocks 69, which blocks are in turn pivoted for rotary horizontal movement in the plates 70 secured to the floor of the vehicle. Rods 71 prevent the rollers 67 from falling too low, and springs 68 furnish resistance to their being raised above their lowest position. As the driving force varies it may frequently happen that the vehicle will have a bearing on three wheels, one of them being either the front or rear auxiliary wheel 67. The principle of balancing, however, makes such third bearing intermittent in character and never large in amount.

Pivoting the arms 68 for vertical movement and providing springs 72 make this third support, or bearing, yielding in nature so that it will not jar the vehicle. The necessity of this is obvious from the intermittent character of the bearing. A lip 73 on the plate 69 serves as a stop for this vertical movement in case an excessive load should be thrown upon the wheel 67. Pivoting the wheels 67 for horizontal rotary movement makes them in effect coasters so that they will not slide on the ground in case they come in contact with it when the vehicle is turning.

Located in the front part of the vehicle are two treadles 74 which are connected to and operate brake shoes 75 that engage the flanges 62 on rims 63 of wheels 21. As the driving connections from the motor are independent to each wheel 21, and as the velocity with which these wheels are driven automatically varies inversely to the resistance encountered, it will be obvious that by applying a brake to either wheel, that wheel will be caused to run more slowly and thus the vehicle be caused to turn in its course. There are therefore, two means for steering the vehicle, one by pressure applied to the button heads 49, and the other by pressure applied to the treadles 74. The first accomplishes its result by an unequal distribution of power between the wheels 21 without wasting any of the power furnished, and consequently is the one that will ordinarily be employed on a level or going up grade. The second accomplishes its result checking the velocity of the wheels and is consequently the one which will be usually employed when going down grade or when it is desired to run very slowly on a level.

It may happen from unequal adjustment of the springs 44, or from unequal friction in the connections to the wheels 21, or from some other cause not readily discernible, that the wheels 21 will be driven at unequal speed and consequently that the vehicle will normally run to the right or left in the arc of a large circle instead of in a straight line. To overcome this difficulty a spring 76 and nut 77 is placed on each rod 47 in a convenient place for adjustment. The tensions of these springs counteract each other, and if their tensions are equal their action is equivalent to that of the downward inclination of the arms of the lever 42, namely, a tendency to hold all of the parts connected to lever 42 in their mid position. If, however, the vehicle at any time develops a tendency to depart from a straight course, that tendency can be overcome by adjusting one or the other of the nuts 77 so as to vary the tension of the corresponding spring 76.

What I claim is:—

1. The combination with a driving member furnishing a constant power at a constant speed, and a driven member subjected to variable resistances, of a variable speed mechanism connecting the two, and automatically operating means for adjusting said variable speed mechanism so that the driven member will absorb a constant power under all changes of resistance.

2. A driving disk, a roller in contact with the face of said disk and subjected to varying resistances to being driven, and automatically operating means for controlling the position of said roller so that its distance from the center of said disk and its resistance to being driven will equal a constant torque on said driving disk.

3. A driving disk and a driven disk, a roller between the two and in contact with the faces of both so as to serve as a means of conveying power from the driving member to the driven member, a constant force applied to the driving disk and a variable resistance applied to the driven disk, and automatic means for shifting said roller on the faces of said disks.

4. In combination with a motor furnishing a constant power at a constant speed, an automatic device for transforming the output of said motor into a constant power at a variable speed.

5. A driving roller and a driven disk in contact with each other, a movable support for said roller so arranged that the roller may be inclined with respect to said disk, a weighing device for measuring the force of transmission between said roller and said disk, and means by which said weighing device will operate said support so as to shift the position of said roller on said disk.

6. The combination with two disks and a roller between them serving to convey power from one of said disks to the other, a pivoted support for said roller, means for inclining said support, and means for causing said roller to automatically move axially on its support when said support is so inclined.

A motor, a pair of wheels, independent connections from the motor to the wheels for driving them, a variable speed mechanism in each connection, and an independent governor for controlling the changes of each variable speed mechanism.

8. A motor, a pair of independently movable wheels, independent connections from the motor to each wheel, a variable speed mechanism in each connection, a governor for controlling the changes of speed, and means for controlling the governor so as to vary the speed of the wheels with respect to each other.

9. In a variable speed mechanism, a governor for automatically changing the speed so that a variable resistance will absorb a constant amount of power, and means for adjusting said governor so that its change of speed will correspond to the transmission of a different amount of power.

10. A pair of disks rotating in parallel and adjacent planes, a friction roller between said disks and serving to transmit power from one to the other, a support upon which said roller rotates, means for shifting the angular position of said support, and means by which aid roller automatically moves axially on said support when said support has its angular position so shifted.

11. A pair of disks rotating in parallel and adjacent planes, a friction roller between said disks and serving to transmit power from one to the other, a device for weighing the amount of power so transmitted, and means whereby said weighing device will act to maintain the transmitted power at a constant quantity.

12. A pair of disks rotating in parallel and adjacent planes, a friction roller between said disks and serving to transmit power from one to the other, a device for weighing the power so transmitted, means whereby the weighing device will maintain the transmitted power at a constant quantity, and means for adjusting the weighing device so that a different amount of power will be transmitted.

13. The combination with a vehicle, a motor for driving it, and steering mechanism therefor, of adjustable devices adapted to be set so as to cause the vehicle to normally follow a prescribed course, and means for manually guiding said vehicle into some other course without disturbing the adjustment of said devices.

14. The combination with a motor driven vehicle, of a balanced steering device therefor, means for adjusting the balance of said steering device so as to cause the vehicle to normally follow a prescribed course, and manually operated means for disturbing the normal balance so as to cause the vehicle to temporarily follow a course different from its prescribed one.

15. A disk and a friction roller in contact therewith for the transmission of power, means for weighing the power transmitted, and means whereby upon the power varying from a predetermined quantity said weighing device will incline the axis of said roller from its normal position so as to cause said roller to travel radially over the face of said disk.

16. A pair of disks on parallel and adjacent shafts, a friction roller between the faces of said disks and serving to transmit power from one to the other, a rod upon which said roller is mounted and rotates, and automatic means for causing said roller to move axially on said rod so as to vary its position on said disks.

17. A pair of disks on parallel and adjacent shafts, a friction roller between the faces of said disks and serving to transmit power from one to the other, a rod upon which said roller is mounted and rotates, a pivoted support for said rod at the axis of one of said disks, and means for giving said rod a limited movement about its pivot.

18. A pair of disks on parallel and adjacent shafts, a friction roller between the faces of said disks and serving to transmit power from one to the other, a rod upon which said roller is mounted and rotates, a pivoted support for one end of said rod at the axis of one of said disks, and a spring support at the other end of said rod.

19. A pair of disks on parallel and adjacent shafts, a roller for transmitting power from one disk to the other, a rod upon which said roller is mounted and rotates, a pivoted support for one end of said rod at the axis of one of said disks, a spring support for the other end of said rod, and means for adjusting the tension of said spring.

20. A driving disk, a rod pivoted at the axis of said disk and supporting a roller in contact with the face thereof, and automatic means for causing said roller to move axially on said rod so as to vary the position of the roller on the face of the disk.

21. A driving disk, friction rollers in contact with opposite faces of said disk, an independent wheel driven by each roller, and means whereby said rollers may be shifted independently or together on the faces of said disk.

22. A driving disk, friction rollers in contact with opposite faces of said disk, an independent wheel driven by each roller and subjected to varying amounts of resistance, and means whereby the positions of said rollers on said disk are controlled by the resistance encountered by said wheels.

23. A driving disk, friction rollers in contact with opposite faces of said disk, an independent wheel driven by each roller and subjected to varying amounts of resistance, and means for varying the positions of said rollers on said disk so that the sum of the resistances of said wheels will equal a predetermined torque on said disk.

24. A driving disk, friction rollers in contact with opposite faces of said disk, an independent wheel driven by each roller and subjected to varying amounts of resistance, and a weighing device for controlling the positions of said rollers so that the driving force of said disk will be equal to a constant torque.

25. A driving disk, a pair of independently movable driven disks the resistance of which are independently variable, and means for varying the speeds of the driven disks so as to maintain a constant torque on the driving disk.

26. A driving disk, a pair of driven disks subjected to variable resistances, a governor for varying the speed of the driven disks so as to maintain a constant torque on the driving disk, and means for controlling the division of power between said driven disks so as to cause them to run at any desired speed relatively to each other.

27. A driving shaft, a pair of independently movable driven shafts each of which is independently subjected to variable resistances, a governor for varying the speeds of the driven shafts so that the sum of their resistances, will represent a constant torque on the driving shaft, and means automatically acting to cause said driven shafts to rotate at an equal speed.

28. A pair of independently movable shafts, a governor for independently varying the speed of either shaft in accordance with the resistance encountered in driving it, and means automatically acting to restore an equality of speed in said shafts when the equality has been distributed by unequal resistance.

29. A pair of independently movable driven disks upon a common axis, a driving disk rotating between the driven disks, friction rollers serving to transmit power from the driver to the driven, a governor for maintaining the total power transmitted at a constant quantity, means for varying the relative speeds of the driven disks without disturbing the action of the governor, and means automatically acting to cause said driven disks to rotate at an equal speed.

30. A driving disk and a pair of driven disks, a separate roller for transmitting power from the driving disk to each driven disk, a supporting rod for each roller, a pivot for each rod at the axis of the driving disk, means whereby either rod may turn on its pivot so as to cause a variation in the radial position of its roller, and stops for limiting the pivotal movement.

31. In a motor vehicle, a pair of independently movable wheels, a driving shaft, independent connections from the driving shaft to each wheel, an independent variable speed mechanism in each connection, a governor controlling said variable speed mechanisms so that the total power transmitted to said wheels will be a constant quantity under varying resistances, and means for controlling said governor so that the power will be divided between said wheels in any desired ratio.

32. In combination with a vehicle and a motor for driving it, independent connections from said motor to independently movable driving wheels, means whereby varying the speed of said driving wheels with respect to each other will vary the course of said vehicle, a variable speed mechanism in each connection and means for controlling them to cause such change of course, and means automatically acting to return said vehicle to a straight course.

33. In a motor vehicle, a pair of independently movable driving wheels, a flange projecting from the side of each wheel, a friction roller engaging each flange for driving its wheel, a motor, independent variable speed mechanisms between said motor and said friction rollers, and means for controlling said variable speed mechanisms so as to cause said driving wheels to run at any desired relative speed.

34. In a vehicle, two motors having their shafts in line, a wheel mounted on the ends of both shafts, means whereby said wheel may be driven by either motor independently or by both together, and means for transmitting power from said wheel to the driving wheels of said vehicle.

35. In a vehicle, two motors having their shafts in line, a disk mounted upon the ends of both shafts, means whereby said disk may be driven by either or by both motors, means for transmitting to the wheels of the vehicle the power delivered to said disk, and means for dividing the transmitted power in any desired ratio between different wheels.

36. In a vehicle, a rotatory disk, two motors, means whereby said disk may be driven by either or by both motors, means for transmitting power from said disk through independent variable speed mechanism to independently movable driving wheels on said vehicle, and means for controlling said variable speed mechanisms so that the speed of said driving wheels and their resistance to motion will equal the amount of power delivered to said disk.

37. In a vehicle, two motors, connections by which either or both of which may drive said vehicle, and a device by which a constant speed of said motors is transformed into a variable speed of said vehicle, said variable speed being automatically adjusted so that the product of the speed of the vehicle by its resistance to motion will equal the power delivered by said motor or motors.

38. In a vehicle offering continually varying resistances to being driven, a motive power adjustable for the delivery of any one of several predetermined amounts of power, a governor for automatically adjusting the speed of the vehicle to correspond to the resistance encountered and a definite amount of power supplied, and means for adjusting said governor for some other amount of power.

39. In a vehicle offering continually varying resistances to being driven, a motive power, a governor for transforming the constant speed of the power supplied into a variable speed of the vehicle proportioned to the resistance encountered, means for varying the amount of power supplied, means for adjusting the governor to suit such variations of power, and means for controlling both the power supply and the governor by the movement of a single lever.

40. In combination with a vehicle and a motor for driving it, independent driving connections to each of two wheels, automatic means by which the speed of each wheel varies in accordance with the resistance it encounters, and means for applying additional resistance to either wheel so as to change its speed.

41. In a motor vehicle provided with independent driving connections to each of two wheels, an automatic controlling device for varying the speeds of said wheels as their resistance varies, and a brake by which additional resistance may be applied to either wheel.

42. In a friction driving device, friction rollers through which power is transmitted in different directions, a spring support under each roller the tension of which determines the amount of power transmitted through the connected roller, and means for shifting the spring tension in any desired amount from one roller to another.

43. In a friction driving device, friction rollers through which power is transmitted in different directions, a spring support under each roller the tension of which determines the amount of power transmitted through the connected roller, means for increasing or decreasing such tension equally for each roller, and means for shifting such tension from one roller to another without varying the total amount.

44. In a friction driving device, friction rollers through which power is transmitted in different directions, a spring support for each roller the tension of which determines the amount of power transmitted through the connected roller, and means for increasing or decreasing the tension for each roller equally.

45. In a friction driving device, friction rollers through which power is transmitted in different directions, a spring support under each roller the tension of which determines the amount of power transmitted through the connected roller, a lever for varying the tension equally for each roller, and a second lever for transferring tension from one roller to another.

46. In a friction driving device, a friction roller through which power is transmitted, a spring support for said roller the tension of which determines the amount of power transmitted, a lever for increasing and decreasing the tension under said roller, and connections to said lever for correspondingly increasing and decreasing the power supply to said roller.

47. A pair of parallel shafts, a disk on each shaft, a rod pivoted on one of said shafts and extending between the faces of the disks, and a roller mounted to rotate upon said rod and to convey power from the face of one disk to the face of the other.

48. A pair of parallel shafts, a disk on each shaft, a rod pivoted at the axis of one shaft and extending between the faces of the disks, a roller mounted upon said rod and engaging the faces of both disks so as to transmit power from one to the other, and means for giving said rod a small movement on its pivot.

Signed by me at Chicago, Illinois this 26th day of July, 1899.

CASPER L. REDFIELD.

Witnesses:
HOWARD A. REDFIELD,
H. C. FISCHER.